United States Patent
Miyazawa et al.

(10) Patent No.: US 6,665,156 B2
(45) Date of Patent: Dec. 16, 2003

(54) MAGNETORESISTIVE HEAD, MANUFACTURE THEREOF, AND MAGNETIC RECORDING/REPRODUCING APPARATUS WITH SUCH MAGNETIC HEAD

(75) Inventors: Kenichi Miyazawa, Shizuoka-ken (JP); Shuichi Sawada, Shizuoka-ken (JP); Yukio Wakui, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 427 days.

(21) Appl. No.: 09/818,753

(22) Filed: Mar. 27, 2001

(65) Prior Publication Data

US 2001/0026425 A1 Oct. 4, 2001

(30) Foreign Application Priority Data

Mar. 28, 2000 (JP) ........................................ 2000-088874

(51) Int. Cl.⁷ .............................................. G11B 5/127
(52) U.S. Cl. .................................................. 360/327.31
(58) Field of Search .......................... 360/327.31, 126, 360/119, 120, 121, 324.12; 324/252; 29/603.14, 603.16

(56) References Cited

U.S. PATENT DOCUMENTS

| | | | | |
|---|---|---|---|---|
| 5,668,686 A | * | 9/1997 | Shouji et al. | 360/126 |
| 5,880,910 A | * | 3/1999 | Shouji et al. | 360/126 |
| 5,926,348 A | * | 7/1999 | Shouji et al. | |
| 5,943,763 A | * | 8/1999 | Shouji et al. | 29/603.14 |
| 6,018,443 A | * | 1/2000 | Watanabe et al. | |
| 6,040,962 A | * | 3/2000 | Kanazawa et al. | 360/126 |
| 6,385,017 B1 | * | 5/2002 | Min et al. | 360/324.12 |
| 6,591,481 B2 | * | 7/2003 | Shimazawa et al. | 29/603.18 |

FOREIGN PATENT DOCUMENTS

| | | |
|---|---|---|
| JP | 7-122925 | 12/1995 |
| JP | 11-86237 | 3/1999 |

* cited by examiner

*Primary Examiner*—Allen Cao
(74) *Attorney, Agent, or Firm*—Dickstein, Shapiro, Morin & Oshinsky, LLP.

(57) ABSTRACT

By constituting a MR head with a pair of magnet films defining a recess on a lower gap layer, the recess having generally an inverted trapezoid shape in cross section; a magnetoresistive film covering a bottom and side wall of the recess and partial upper surfaces of the pair of magnet films; and a pair of electrically conductive films formed on the magnet films and being in contact with said magnetoresistive film only at a position outside of the recess, it becomes possible to reduce a variation in reading track widths of MR heads even under mass production.

35 Claims, 14 Drawing Sheets

MAGNETORESISTIVE HEAD, MANUFACTURE THEREOF, AND MAGNETIC RECORDING/REPRODUCING APPARATUS WITH SUCH MAGNETIC HEAD

This application is based on Japanese Patent Application 2000-88874 filed on Mar. 28, 2000, the entire contents of which are incorporated herein by reference.

BACKGROUND OF THE INVENTION a) Field of the Invention

The present invention relates to a magnetoresistive head, a manufacture method thereof, and a magnetic recording/reproducing apparatus with such a magnetic head.

b) Description of the Related Art

Magnetic recording/reproducing apparatus such as hard disk drives are rapidly reducing their sizes and increasing recording densities. The recording track width of a recording medium is becoming narrower than ever to improve the recording density.

In order to compensate for a reproduction output level lowered by a narrower width of a recording track, a magnetoresistive head (hereinafter abbreviated to "MR head") having a high sensitivity has been developed. Recently, an MR head capable of obtaining a large output signal by utilizing a giant magnetoresistance effect (hereinafter abbreviated to "GMR") is practically used.

An MR head utilizing GMR uses a multi-layer magnetic film (spin valve film) formed, for example, by sequentially stacking a ferromagnetic layer (free layer) whose magnetization direction is changed with an external magnetic field, a non-magnetic conductive layer, a ferromagnetic layer (pinning layer) whose magnetization direction is pinned down, and an antiferromagnetic layer for pinning the magnetization direction of the pinning layer.

It is important to suppress Barkhausen noises of an MR head using a spin valve film to be generated by discontinuous motion of magnetic domain walls in the free layer. The structure of efficiently applying a longitudinal magnetic field to the free layer has been adopted to suppress Barkhausen noises.

Typical examples of the longitudinal magnetic field applying structure are an abutted junction structure such as disclosed in JP-B-7-122925 and a gull wing structure such as disclosed in JP-A-11-86237 in which this structure is called an overlaid structure.

FIG. 13 shows an MR head having the abutted junction structure shown in JP-B-7-122925.

An MR head 40 shown in FIG. 13 has an MR film 43 and a pair of hard magnets for applying a longitudinal magnetic field to the MR layer 43. The MR film 43 is formed on a lower gap layer 42 formed on a lower shield film 41 on a substrate (not shown). Each hard magnet is constituted of a magnet film 44 formed on the lower gap layer 42 and an electrically conductive film 45 formed on the magnetic film 44.

This MR head 40 constructed as above is manufactured in the following method. An MR film is deposited and a mask is formed on the MR film to remove an unnecessary portion thereof by milling and form the MR film 43. Then, the magnet film 44 is deposited on the exposed surface of the lower gap layer 42 and the conductive film 45 is deposited. Lastly, the mask is removed by lift-off. A reading track width TW is equal to the space between opposite ends of the pair of hard magnets of the MR head 40.

The MR film 43 of the MR head 40 formed by milling has a forward tapered side wall 43a depending upon a milling angle and a shadowing effect of oblique milling. Therefore, the side wall 44a of the magnet film 44 for applying a longitudinal magnetic field to the MR film 43 has a backward tapered shape. In order to narrow a reading track, the ferromagnetic layer (free layer) of the MR film 43 is formed to have the upper narrowed tapered portion, and the MR film 43 becomes in contact with the magnet film 44 only at its side walls 43a.

Therefore, the magnet film 44 gives the MR film 43 a magnetic effect only or dominantly of a static magnetic field. This poses the problem that a single domain cannot be formed efficiently in the MR film 43. Another problem is unstable electrical conduction between the MR film 43 and conductive film 45 because they contact only at the side walls 43a. Another problem is burs formed on the edges of the magnet film 44 or conductive film 45 when the mask used for milling is lifted off. Burs near the free layer make the gap thickness of the MR head irregular. Therefore, signal separation between adjacent bits in a recording medium becomes imperfect, or at the worst, the magnet film 44 and an upper shield layer to be formed at a later process may be short-circuited.

FIG. 14 shows an MR head having the gull wing structure such as shown in JP-A-11-86237.

An MR head 50 shown in FIG. 14 has a lower shield film 51 formed on a substrate (not shown), a lower gap layer 52 formed on the film 51, a pair of hard magnets formed on the lower gap layer 52 and an MR film 55. Each of the hard magnets is constituted of a magnet film 53 formed on the lower gap layer 52 and an electrically conductive film 54 formed on the magnet film 53. The magnet film 53 applies a longitudinal magnetic field to the MR film 55.

In manufacturing the MR head 50 constructed as above, a magnet film and a conductive film are laminated and portions thereof corresponding to the reading track width TW are removed by milling to form the magnet film 53 and conductive film 54. Thereafter, an MR film is deposited and an unnecessary portion thereof is removed to form the MR film 55. The reading track width TW is equal to the width of a contact region of the MR film 55 with the lower gap layer 52.

Since the MR film 55 of the MR head 50 manufactured by this method is in surface contact with the magnet film 53 and conductive film 54, electrical conduction therebetween is more reliable than the MR head 40 having the abutted junction structure. Since the side walls of the magnet film 53 on the MR film 55 side have the forward tapered shape, a single domain can be formed in the MR film 55 by positively using not only the static magnetic field applied by the magnet film 53 but also exchange coupling at the interface between the magnet film 53 and MR film 55.

For mass production of MR heads, generally a number of MR heads are formed at a time on a single large area substrate, and each MR head together with a partial region of the large area substrate is cut from the substrate.

With this method, a variation in thicknesses of each film formed on the whole area of the large area substrate becomes a variation in reading track widths TW of MR heads 50 under mass production. The reason for this will be described with reference to FIGS. 15A to 15C.

FIGS. 15A to 15C are schematic cross sectional views illustrating the manufacture processes for the MR films 55 of the MR heads 50.

A film to be used for the magnet films 53 is formed, for example, by depositing a CoCrPt alloy layer (60 nm in thickness) on an underlying film (20 nm in thickness) of Cr. A film to be used for the conductive films 54 is formed, for example, by depositing a Ta alloy layer (200 nm in thickness) on an underlying film (20 nm in thickness) made of Ti. The thickness of the magnetic film 53 and conductive film 54 (a thickness of as great as 300 nm in total) formed on the lower gap layer 52 has inevitably a variation.

FIG. 15A shows a thin portion X and a thick portion Y of a laminated film of the magnet film 53 and conductive film 54.

A variation in film thicknesses is generated because of different film forming rates in each area of a large area substrate. For example, a variation in film forming rates is suppressed by rotating a substrate relative to the target in a sputtering system. However, there is no film forming system for mass production which has the same film forming rate in the whole area of a large area substrate. A film thickness difference in the whole area of a large area substrate becomes larger as the thickness of a film becomes greater.

As shown in FIG. 15B, when the conductive film 54 and magnet film 53 in the thin portion X is trenched by milling and the low gap layer 52 is exposed, the lower gap layer 52 in the thick portion Y is not still exposed. In FIG. 15B, reference symbol 54a represents a mask used for milling.

FIG. 15C shows the state of each film when milling continues after the state shown in FIG. 15B.

As shown, as milling continues, the conductive film 54 is trenched and the lower gap layer 52 in the thick portion Y exposes. In the thin portion X, the lower gap layer 52 is trenched so that the reading track width TW is broadened. From this reason, there is a variation in reading track widths TW of MR heads 50 formed by mass production.

FIG. 16 is a schematic diagram illustrating a variation in reading track widths of MR heads 50 formed by mass production.

A general sputtering system was used to deposit a Cr film (20 nm in thickness)/a CoCrPt alloy layer (60 nm in thickness)/a Ti film (20 nm in thickness)/a Ta alloy layer (200 nm in thickness), and milling was performed to form a lamination film ML of a magnetic film and an electrically conductive film on the lower gap layer 52.

A variation in reading track widths TW was calculated as in the following on the assumption that a tip angle θ of the lamination film ML was 20 degrees (θ=20°) and that a variation t in average thicknesses of the lamination films ML on a large area substrate was about ±3%.

Since the total film thickness T of the lamination film ML is 300 nm, the variation t in film thicknesses is 18 nm (t=0.03×2×300 nm) at a maximum. A variation in tip positions of the lamination films ML is 49.5 nm ($TW_1$=18 nm/tan 20°) on one side ($TW_1$). As this variation is converted into a variation in reading track widths TW, the reading track width variation is doubled to 99 nm ($2TW_1$) which is about 0.1 μm.

This calculation is assumed that a variation in milling precisions in in-plane is zero. Therefore, an actual variation is larger than 0.1 μm. Such a variation cannot be permitted for the manufacture of thin film magnetic heads compatible with narrow tracks.

In order to reduce a variation in film thicknesses of the magnet film 53 and conductive film 54, it is desired to thin these films as much as possible. However, as the conductive film 54 is thinned, the electric resistance thereof other than the MR film 55 is increased so that the MR ratio (=ΔR/R) lowers and the reading-out sensitivity is lowered. To solve this, an MR head having a gull wing lead-overlaid structure such as shown in JP-A-11-86237 has been proposed which is an improved MR head of the gull wing structure.

FIG. 17 shows an MR head 60 of the gull wing lead-overlaid structure proposed in JP-A-11-86237.

As shown, an MR head 60 has a lower gap layer 62 formed on a lower shield film 61 on a substrate (not shown), and a pair of magnet films 63 formed on the lower gap layer 62. There is a recess of an inverted trapezoid shape between the pair of magnet films 63. An MR film 64 is formed extending from the bottom of the recess to the surfaces of the magnet films 63. A pair of electrically conductive films (overlaid electrodes) 65 covers the magnet films 63 and MR film 64, the conductive films facing each other over the bottom of the recess.

The pair of magnet films 63 is formed by depositing a magnet film and forming the recess through this film. The side wall of each magnet film 63 on the recess side has a forward tapered shape. A film to be used for forming the MR film 64 is deposited on the pair of magnet films 63 and recess and an unnecessary portion thereof is removed to form the MR film 64. A film to be used for forming the conductive films 65 is deposited on the MR film 64 and on the pair of magnet films 63, and an unnecessary portion thereof is removed to form the pair of conductive films (overlaid electrodes) 65.

The overlaid electrodes 65 of the MR head 60 extend to the inside of the recess from the tips 63a and 63b of the magnet films 63. The reading track width TW is therefore determined by a distance 65a (TW=65a) between the pair of overlaid electrodes 65. Even if there is a variation in distance (recess bottom width) 63c between tips of the pair of magnet films 63, this variation will not substantially influence the reading track width TW.

However, the thickness of the upper gap layer of the MR head 60 is likely to become irregular, because of a relatively large step between the surface of the MR film 64 and the upper surfaces of the overlaid electrodes (conductive films) 65.

FIG. 18 shows an MR head 60 with an upper gap layer 66. As shown, the upper gap layer 66 is formed on the MR film 64 and the pair of overlaid electrodes 65. Since there is a relatively large step between the surface of the MR film 64 and the upper surfaces of the overlaid electrodes 65, the thickness of the upper gap layer 66 in the reading track width TW may become not uniform.

In reading a signal from one bit in a recording medium, it is desired to pick up this signal at a high output level and eliminate the adverse effect of a signal which may be read at the same time from an adjacent bit. It is desired therefore to make uniform the gap thickness corresponding to the thickness of the region sandwiched between the upper and lower shield layers over the whole area (whole reading track width) of the free layer of the MR head. Since the thickness of the upper gap layer 66 of the gull wing lead-overlaid structure is not uniform, the gap thickness is likely to become irregular. Separation of a signal read-out from a recording medium from garbage unwantedly read-out from the recording medium is therefore likely to become imperfect.

The pair of overlaid electrodes 65 is generally formed through photolithography. It is therefore difficult to form the pair of overlaid electrodes 65 to have a predetermined distance, i.e., a distance corresponding to the reading track width TW therebetween.

As shown in FIG. 19, in forming a pair of overlaid electrodes 65, an electrically conductive film 65c is first deposited and resist 67 is coated on this film 65*c*. The resist 67 is partially exposed in the area corresponding to the space to be formed between the pair of overlaid electrodes 65. The resist 67 is developed to remove the resist 68 exposed to light. By using the left resist 67 as a mask, the conductive film 65*c* is etched by milling.

The conductive film 65*c* under the resist 67 have slanted surfaces. Since exposure light reflects at this slanted surface during the exposure, it is difficult to expose a predetermined pattern so that a variation in reading track widths TW is likely to occur.

The positions of the pair of overlaid electrodes 65 shift inevitably in accordance with an alignment precision (e.g., 0.5 µm) of an exposure system to be used for photolithography.

FIG. 20 shows an example of the positions of a pair of overlaid electrodes 65 shifted from desired positions.

Opposite ends 65*a* and 65*b* of the overlaid electrodes 65 are required to be positioned in the bottom width 63*c* of the recess formed between the right and left magnet films 63. In order to form the overlaid electrodes at predetermined positions, it is necessary that the bottom width 63*c* of the recess have a size larger than a value of the alignment precision of an exposure system.

As the bottom width 63*c* of the recess becomes broader, a static magnetic field effect of the magnet films 63 to the MR film 64 is weaken and a single domain is difficult to be formed in the MR film 64.

In order to positively utilize the MR ratio of the MR film 64 of the gull wing lead-overlaid structure and obtain a high reading-out efficiency, it is desired to lower the electrical resistance of components other than the MR film 64 as much as possible. However, if the overlaid electrodes 65 are made thicker to lower the electrical resistance thereof other than the MR film 64 of the gull wing lead-overlaid structure, irregularity of the gap thickness increases further or the overlaid electrodes become difficult to be formed.

SUMMARY OF THE INVENTION

It is an object of the present invention to provide a magnetoresistive head having the structure that the head is compatible with narrow tracks and that the reading-out sensitivity of each head formed by mass production can be easily prevented from being lowered and the uniformity of a reading track width of each head can be easily prevented from being lowered.

It is another object of the present invention to provide a recording/reproducing magnetic head having the structure that the head is compatible with narrow tracks and that the reading-out sensitivity of each head formed by mass production can be easily prevented from being lowered and the uniformity of a reading track width of each head can be easily prevented from being lowered.

It is still another object of the present invention to provide a method of manufacturing a magnetoresistive head having the structure that the head is compatible with narrow tracks and that the reading-out sensitivity of each head even under mass production can be easily prevented from being lowered and the uniformity of a reading track width of each head can be easily prevented from being lowered.

It is a further object of the present invention to provide a magnetic recording/reproducing apparatus provided with a recording/reproducing magnetic head having the structure that the head is compatible with narrow tracks and that the reading-out sensitivity of each head even under mass production can be easily prevented from being lowered and the uniformity of a reading track width of each head can be easily prevented from being lowered.

According to one aspect of the present invention, there is provided a magnetoresistive head, comprising: a lower shield layer formed on a substrate and made of soft magnetic material; a lower gap layer formed on said lower shield layer and made of insulating material; a pair of magnet films formed on said lower gap layer at a predetermined distance therebetween, said pair of magnet films defining a recess on said lower gap layer, the recess having generally an inverted trapezoid shape in cross section; a magnetoresistive film covering a bottom and side wall of the recess and partial upper surfaces of said pair of magnet films; and a pair of electrically conductive films, one of which is formed on one magnet film of said pair of magnet films and the other is formed on the other magnet film of said pair of magnet films, and being in contact with said magnetoresistive film only at a position outside of the recess.

According to another aspect of the present invention, there is provided a recording/reproducing magnetic head comprising: a reading-out magnetic head including (i) a lower shield layer formed on a substrate and made of soft magnetic material, (ii) a lower gap layer formed on said lower shield layer and made of insulating material, (iii) a pair of magnet films formed on said lower gap layer at a predetermined distance therebetween, said pair of magnet films defining a recess on said lower gap layer, the recess having generally an inverted trapezoid shape in cross section, (iv) a magnetoresistive film covering a bottom and side wall of the recess and partial upper surfaces of said pair of magnet films, (v) a pair of electrically conductive films, one of which is formed on one magnet film of said pair of magnet films and the other is formed on the other magnet film of said pair of magnet films, and being in contact with said magnetoresistive film only at a position outside of the recess, and (vi) an upper gap layer made of inorganic insulating material and covering said magnetoresistive film and said pair of electrically conductive films; and a writing head formed on said reading-out magnetic head, said writing head being an induction type magnetic head.

According to another aspect of the present invention, there is provided a method of manufacturing a magnetoresistive head, comprising: a preparing step of preparing a substrate including (i) a lower shield layer made of soft magnetic material, (ii) a lower gap layer formed on said lower shield layer and made of insulating material, (iii) a pair of magnet films formed on said lower gap layer at a predetermined distance therebetween, said pair of magnet films defining a recess on said lower gap layer, the recess having generally an inverted trapezoid shape in cross section, and (iv) a magnetoresistive film covering a bottom and side wall of the recess and partial upper surfaces of said pair of magnet films; and an electrically conductive film forming step of forming a pair of electrically conductive films, one of which is formed on one magnet film of said pair of magnet films and the other is formed on the other magnet film of said pair of magnet films, and being in contact with said magnetoresistive film only at a position outside of the recess.

According to another aspect of the present invention, there is provided a magnetic recording/reproducing apparatus, comprising: a magnetic recording medium; a magnetic head driving unit for rotating forward or backward rotating a rotary shaft; an arm mounted on the rotary shaft and moving along an arc path over said recording medium when driven by the rotary shaft; a suspension mounted on a front end of said arm; and a recording/reproducing magnetic head mounted on said suspension, said recording/reproducing magnetic head including: a reading-out magnetic head including (i) a lower shield layer formed on a substrate and made of soft magnetic material, (ii) a lower gap layer formed on said lower shield layer and made of insulating material, (iii) a pair of magnet films formed on said lower gap layer at a predetermined distance therebetween, said pair of magnet films defining a recess on said lower gap layer, the recess having generally an inverted trapezoid shape in cross section, (iv) a magnetoresistive film covering a bottom and side wall of the recess and partial upper surfaces of said pair of magnet films, (v) a pair of electrically conductive films, one of which is formed on one magnet film of said pair of magnet films and the other is formed on the other magnet film of said pair of magnet films, and being in contact with said magnetoresistive film only at a position outside of the recess, and (vi) an upper gap layer made of inorganic insulating material and covering said magnetoresistive film and said pair of electrically conductive films; and a writing head formed on said reading-out magnetic head, said writing head being an induction type magnetic head.

A reading track width TW of the magnetoresistive head (MR head) constructed as above can be substantially defined when the pair of magnet films is formed on the lower gap layer, whereas the reading track width TW of a conventional MR head is defined when a pair of electrically conductive films thicker than the magnet films is formed. Therefore, a variation in reading track widths TW of MR heads even under mass production can be easily reduced, and compatibility with narrow tracks can be easily realized.

Since the magnetoresistive film (MR film) and conductive films contact at the positions outside of the recess defined on the lower gap layer by the pair of magnet films, a precision of the reading track width TW does not depend upon the thickness of the conductive films so that the conductive film can be easily made thick. Since the good electrical conductivity can be established between the MR film and conductive films, MR heads having a high reading-out sensitivity can be easily mass-produced.

Since the conductive films do not extend to the inside of the recess, even if the upper gap layer is formed on the MR film, a variation in thicknesses of upper gap layers formed on the MR films can be reduced. A variation in gap thicknesses of MR heads even under mass production can be reduced. MR heads capable of separating a signal read-out from a bit of a recording medium from garbage unwantedly read-out from the recording medium can be manufactured easily.

DETAILED DESCRIPTION OF THE PREFERRED EMBODIMENTS

Figure 1A:
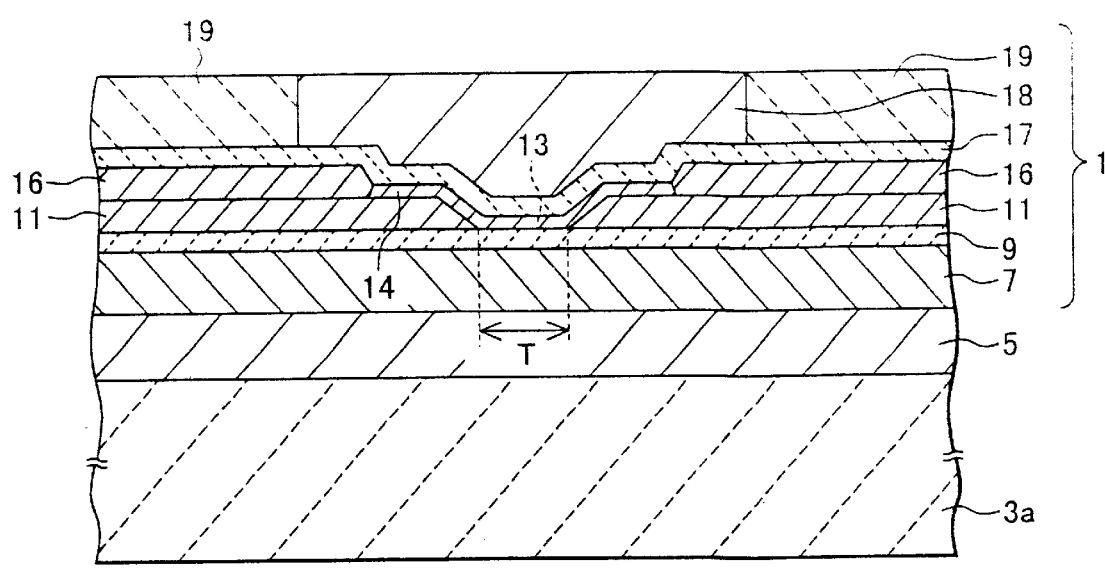
FIG. 1A is a schematic cross sectional view showing the main part of an MR head according to an embodiment.

FIG. 1A is a schematic diagram showing the main part of a magnetoresistive head 1 according to an embodiment. The magnetoresistive head (hereinafter abbreviated to "MR head") 1 is formed on an insulating film 5 made of alumina ($Al_2O_3$). This insulating film 5 is formed on one surface of a substrate 3 constituting a slider and made of ceramic material such as $Al_2O_3$—TiC.

The MR head 1 has a lower shield layer 7 and a lower gap layer 9. The lower shield layer 7 is formed on the insulating film 5 and has a thickness of about 1 to 10 $\mu$m. The lower shield layer 7 is made of soft magnetic material such as permalloy (iron-nickel based alloy) and Sendust (iron-silicon-aluminum based alloy). The lower gap layer 9 is made of insulating material such as alumina and has a thickness of about 10 to 200 nm.

A pair of magnet films 11, 11 is formed on the lower gap layer 9 at a predetermined space between the films. The magnet films 11, 11 define a recess 13 on the lower gap layer 9, the recess having an inverted trapezoid shape in cross section. The width of the bottom (the surface of the lower gap layer 9) of the recess 13 corresponds to the reading track width TW of the MR head 1.

Figure 1B:
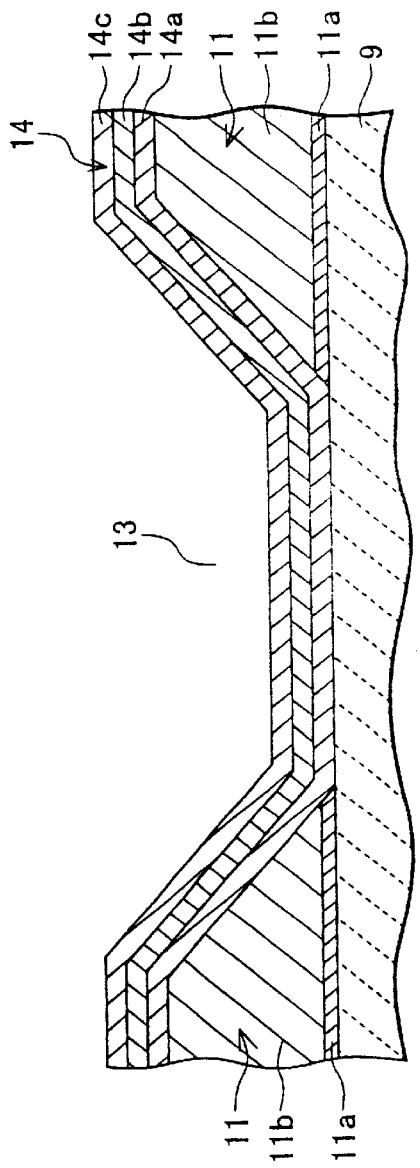
FIG. 1B is a schematic cross sectional view showing an example of an MR film of the MR head shown in FIG. 1A.
Figure 1C:
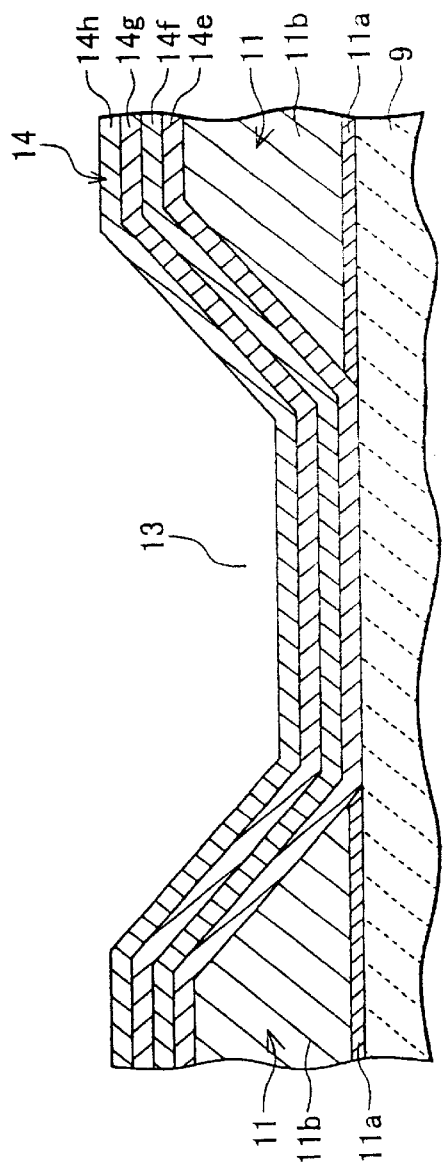
FIG. 1C is a schematic cross sectional view showing another example of an MR film of the MR head shown in FIG. 1A.

As shown in FIG. 1B or 1C, each magnet film 11 is constituted of, for example, an underlying film 11a having a thickness of about 10 to 20 nm and made of Cr, and a single domain forming magnet film (uniaxial anisotropical permanent magnet film) 11b formed on the underlying film 11a and having a thickness of about 20 to 100 nm and made of CoCrPt.

The magnet films 11, 11 apply a longitudinal magnetic field to a magnetoresistive film 14. The magnetoresistive film (MR film) 14 covers the bottom and side walls of the recess 13 and the upper surfaces of the magnet films 11, 11 near the recess 13.

The MR film 14 may be an anisotropic magnetoresistive film (anisotropic magnetoresistive film, hereinafter called AMR film) or a giant magnetoresistive film (GMR film).

As shown in FIG. 1B, an AMR film is a lamination of, for example, a soft magnetic layer 14a made of iron-nickel based alloy or the like, having a thickness of about 1 to 50 nm and changing its magnetization direction with an external magnetic field, a non-magnetic conductive film 14b made of Ti and having a thickness of about 1 to 20 nm, and a soft magnetic film (soft adjacent layer: SAL) 14c having a thickness of about 1 to 50 nm.

As shown in FIG. 1C, a GMR film is a spin valve film which is a lamination film of, for example, at least a ferromagnetic layer (free layer) 14e made of permalloy or the like, changing its magnetization direction with an external magnetic field and having a thickness of about 1 to 10 nm, a non-magnetic conductive layer 14f made of Cu or the like and having a thickness of about 1 to 3 nm, a magnetization pinning layer 14g made of Co—Fe based alloy or the like and having a thickness of about 1 to 3 nm, and an antiferromagnetic layer 14h made of Pt—Mn based alloy, Ir—Mn based alloy or the like and having a thickness of about 5 to 30 nm.

A region of the MR film 14 either an AMR film or a GMR film in contact with the bottom of the recess 13 is a magnetically sensitive region which detects magnetic signals recorded along a track of a recording medium. The MR film 14 is formed so that its axis of easy magnetization is in parallel to the reading track width TW direction. The surface of a recording medium is in parallel to the drawing sheet of FIG. 1.

An electrically conductive film 16 is formed on each of the magnet films 11, 11 adjacent to the MR film 14. The conductive films 16, 16 cover the upper surfaces of the magnet films 11, 11 not covered with the MR film 14.

The conductive film 16 is made of material having a good electrical conductivity such as W, Ta and Nb and has a thickness of about 50 to 200 nm.

An upper gap layer 17 made of inorganic insulating material such as alumina and having a thickness of about 10 to 200 nm is formed covering the MR film 14 and conductive films 16 and 16. An upper shield film 18 and a protective film 19 are stacked in this order on the upper gap layer 17.

For example, the upper shield film 18 is made of a magnetic material such as permalloy, Sendust or the like and has a thickness of about 1 to 10 $\mu$m.

For example, the protective film 19 is made of insulating material such as alumina or the like and has a thickness of about 1 to 50 $\mu$m.

The MR head 1 constructed as above is an MR head dedicated to reproduction (reading-out). Sensing current is flowed from one conductive film 16, through the MR film 14, and to the other conductive film 16.

The pair of magnet films 11, 11 applies a bias magnetic field (longitudinal magnetic field or single domain forming bias magnetic field) along the longitudinal direction of the MR film 14, to thereby enhance uniaxial anisotropy of the magnetically sensitive region of the MR film 14 and prevent multi-domains. Since the magnet films 11, 11 are positioned at approximately the same height as the bottom region of the MR film 14, the distance can be made shortest between the tips of the magnet films 11, 11 defining the reading track width TW and the bent region of the MR film 14 where shape magnetic anisotropy occurs. It is therefore possible that the bent region of the MR film 14 can be applied with a magnetic field sufficiently strong for canceling demagnetizing field to be generated in the MR film 14 by the shape magnetic anisotropy. Multi-domains of the MR film 14 can therefore by prevented and Barkhausen noises can be suppressed.

The reading track width TW of the MR head 1 can be substantially defined when the pair of magnet films 11, 11 is formed, whereas the reading track width TW of a conventional MR head is defined when a pair of electrically conductive films thicker than the magnet films 11, 11 is formed. Therefore, a variation in reading track widths TW of MR heads 1 even under mass production can be easily reduced, and compatibility with narrow tracks can be easily realized.

Since the MR film 14 and conductive films 16, 16 contact at the positions outside of the recess 13, a precision of the reading track width TW does not depend upon the thickness of the conductive films 16, 16 so that the conductive films 16, 16 can be easily made thick. Since the good electric conductivity can be established between the MR film 14 and conductive films 16, 16, MR heads 1 having a high reading-out sensitivity can be easily mass-produced.

Since the conductive films 16, 16 do not extend to the inside of the recess 13, even if the upper gap layer 17 is formed on the MR film 14, a variation in thicknesses of upper gap layers 17 formed on the MR films 14 can be reduced. A variation in gap thicknesses of MR heads 1 even under mass production can be reduced. MR heads 1 capable of separating a signal read-out from a bit of a recording medium from garbage unwantedly read-out from the recording medium can be manufactured easily.

Next, a method of manufacturing a magnetoresistive head according to an embodiment will be described with reference to FIGS. 2 to 9. In the following description, the MR head 1 described above is manufactured by way of example.

Figure 2:
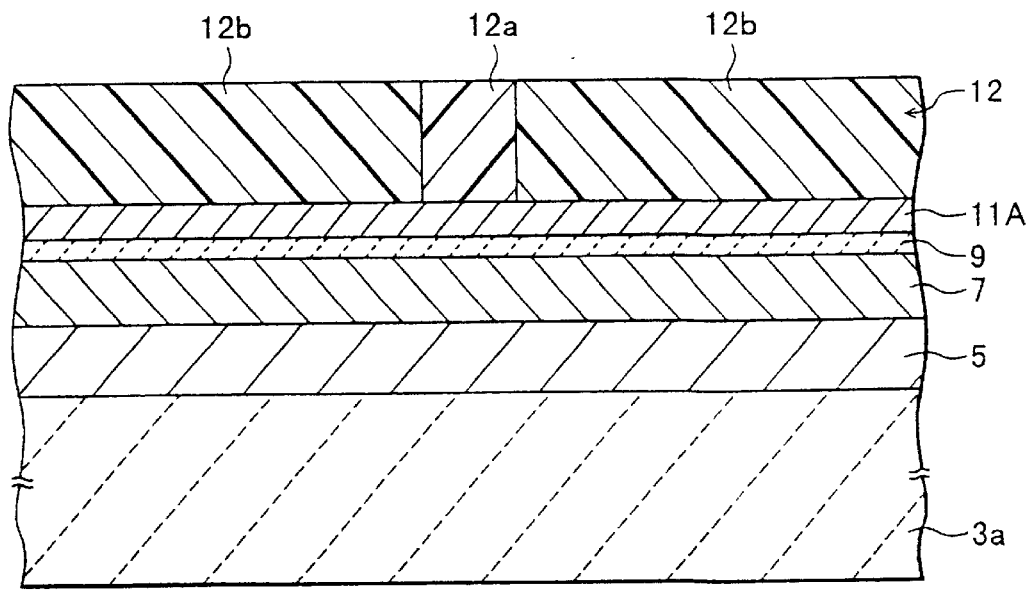
FIGS. 2, 3, 4, 5, 6, 7, 8, and 9 are schematic cross sectional views illustrating a method of manufacturing an MR head according to an embodiment.

As shown in FIG. 2, on one surface of a large area substrate 3a made of ceramic material or the like such as $Al_2O_3$—TiC, an insulating film 5 is formed and a lower shield layer 7 and a lower gap layer 9 are formed over the insulating film 5.

A number of MR heads 1 are eventually formed on the large area substrate 3a. These MR heads 1 together with partial regions of the large area substrate 3a are cut from the large area substrate 3a. The partial region of the large area substrate 3a of each cut MR head 1 is formed later into a slider 3 (FIG. 1A).

A magnet film 11A to be used for forming the magnet films 11 is deposited on the lower gap layer 9 by sputtering, vapor deposition or plating. An average thickness of magnet film 11A is preferably set to a minimum limit value capable of forming a single domain in the free layer of MR film 14 of the MR head 1.

A resist film 12 is formed on the whole upper area of the magnet film 11A. For example, this resist film 12 is formed by spin-coating novolak type positive resist such as AR80 manufactured by Tokyo Ohka Kogyo Co., Ltd. to a thickness of about 1 $\mu$m. The resist film 12 is exposed to have a predetermined pattern.

FIG. 2 shows the resist film 12 after the exposure. As shown, since there is no such a cubic structure under the resist film 12 as a cubic structure which may degrade the pattern contrast, the border between a region 12a exposed to light and a region 12b not exposed is generally vertical relative to the magnet film 11A.

Next, the resist film 12 is developed to form a mask.

Figure 3:
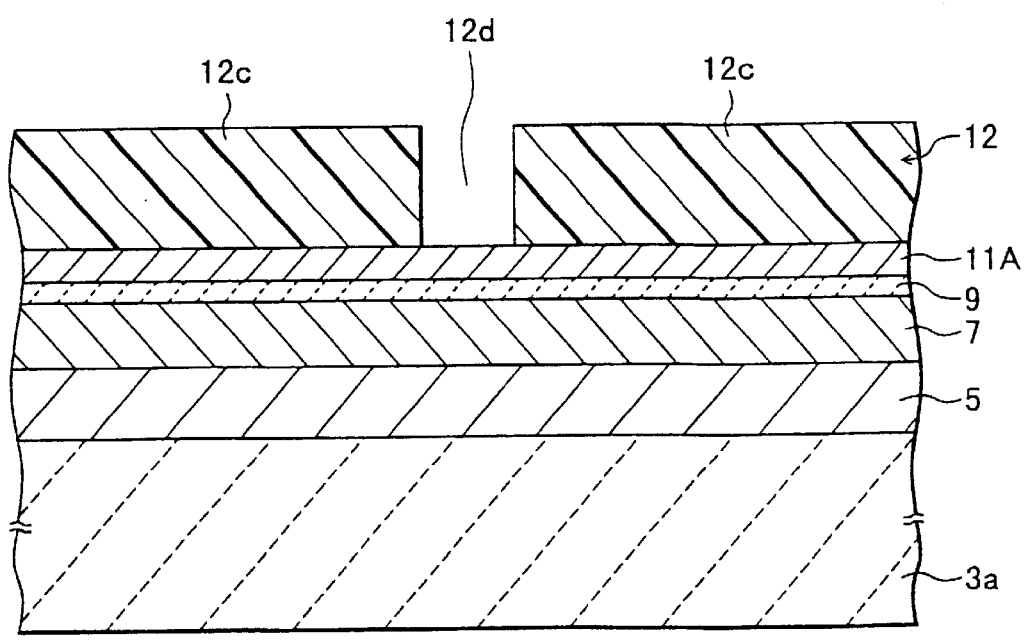

FIG. 3 is a schematic diagram showing an obtained mask 12c. As shown, the mask 12c covers the magnet film 11A excepting recesses 12d from each of which the exposed area 12a shown in FIG. 2 was removed through development. The side wall of the mask 12c defining the recess 12d is generally vertical to the surface of the magnet film 11A.

Next, the large area substrate 3a with recesses 12d is placed on a hot plate to be subjected to a heat treatment, for example, for 30 minutes at 200° C. to reflow (melt) the mask 12c.

Figure 4:
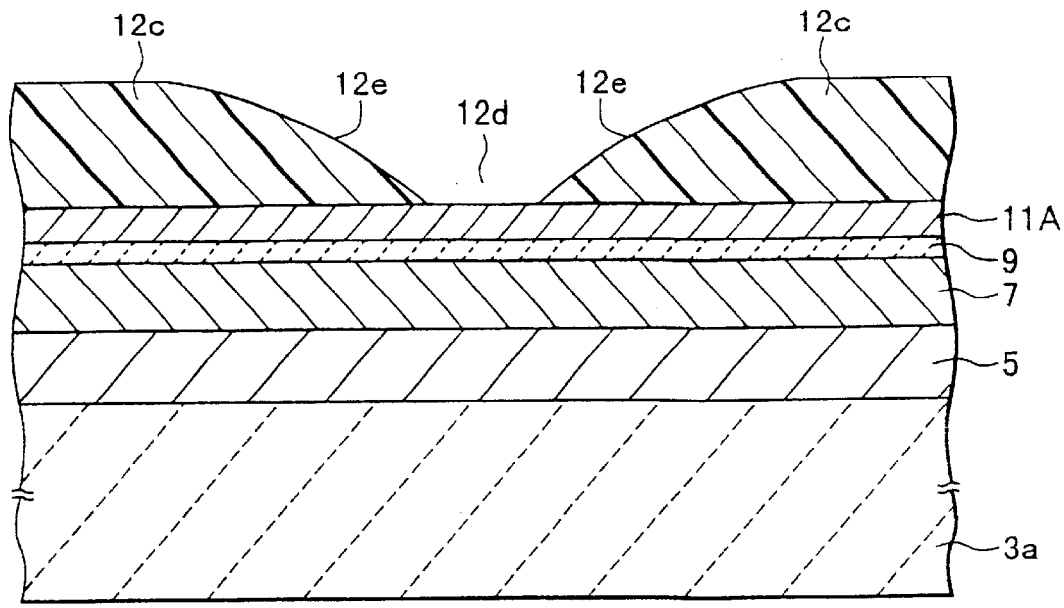

FIG. 4 shows the reflowed mask 12c. As shown, by reflowing the mask 12c, the side wall of the mask 12c defining the recess 12d is changed to a slope surface 12e.

Next, an ion beam of argon ions or the like is radiated to the large area substrate 3a along a direction perpendicular to the surface of the insulating film 5 to thereby etch (ion-mill) the mask 12c and magnet film 11A. At the same time when the magnet film 11A is ion-milled, the mask 12c is also ion-milled so that the slope surface 12e defining the recess 12d retracts toward the right and left sides as viewed in FIG. 4. As the slope surface 12e retracts, the magnet film 11A under the recess 12d is trenched into an inverted trapezoid shape in cross section and a recess is formed. When this trenching reaches the upper surface of the lower gap layer 9, ion milling is stopped.

Figure 5:
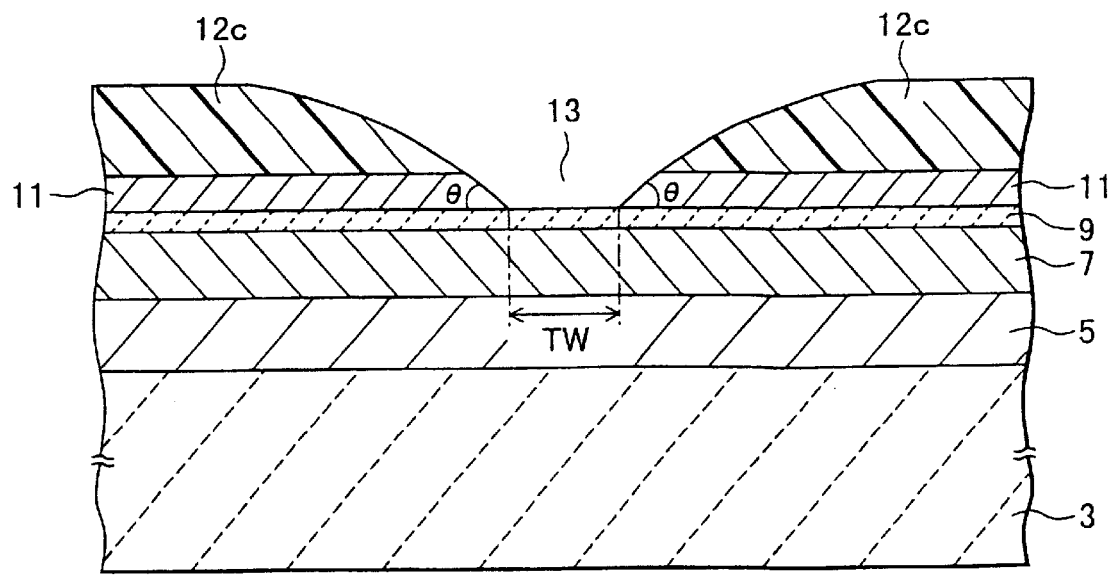

FIG. 5 shows the large area substrate 3 after the ion milling. As shown, the magnet film 11A is cut by the recesses 13 formed by ion milling. A pair of magnet films 11A, 11A facing each other via the recess 13 corresponds to a pair of magnet films 11 of the MR head 1. The width of the bottom of the recess 13 corresponds to the reading track width TW of the MR head 1.

If the ion beam is applied along a direction slightly slanted from the vertical direction, roughness of the milled surface can be eliminated.

A variation in reading track widths TW can be estimated from a variation in film thicknesses in the whole area of the large area substrate 3a to be caused by a performance of a film forming system. A variation in film thicknesses of the magnet films 11, 11 influences the variation in reading track width TW. The following calculation is made on the assumption that the average thickness T of the magnet films 11, 11 is 80 nm, a variation t in film thicknesses 11, 11 in the whole area of the large area substrate 3a is ±3%, and a tip angle θ (refer to FIG. 5) of each magnet film 11, 11 on the recess 13 side is 20°.

Figure 16:
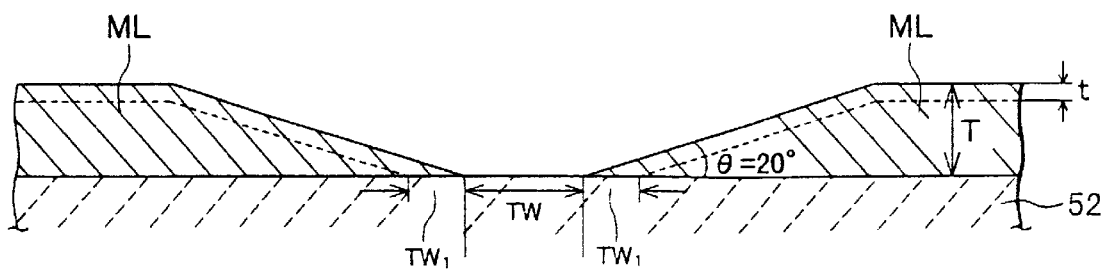
FIG. 16 is a diagram illustrating a variation in thicknesses of laminated layers.

Since the variation t in film thicknesses is ±3% of the film thickness T, a maximum value of the variation t in film thicknesses is 4.8 nm (t=0.03×2×80 nm). A variation in tip positions of each of the magnetic films 11, 11 on the recess 13 side is about 13.2 nm (4.8 nm/tan 20°), and a variation in tip positions of both the magnetic films 11, 11 is doubled to about 26.4 nm. This value is about ¼ of the value of about 99 nm for a conventional gull wing structure described with FIG. 16.

Figure 6:
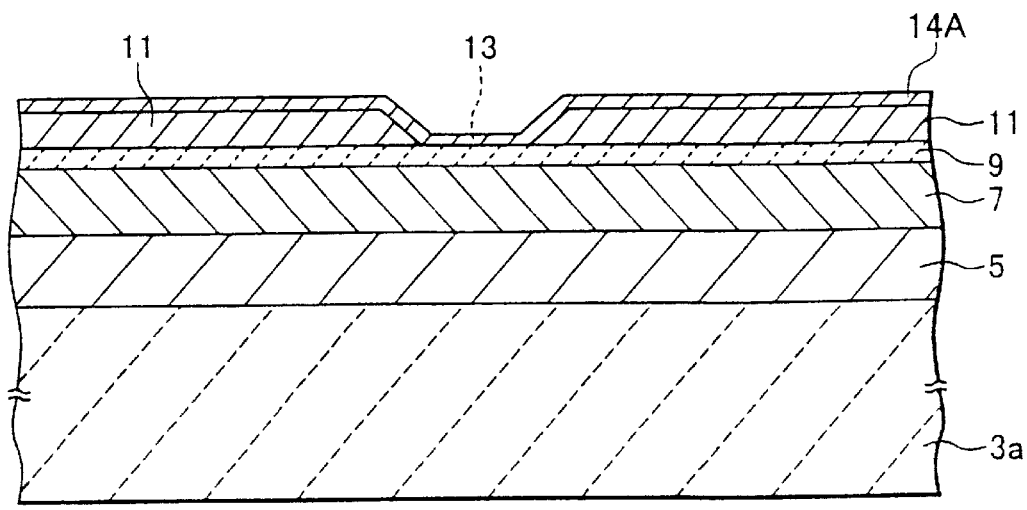

Next, as shown in FIG. 6, the mask 12c used for forming the recess 13 is removed and a film 14A to be used for forming the MR films 14 is formed by sputtering, vapor deposition or the like on the bottom of the recesses 13 and on the magnet films 11. This film 14A is an AMR film or a GMR film. Although the film 14A has a lamination structure, it is represented by a single layer in FIGS. 6 and 7.

If the MR film 14 is an AMR film, the film 14A has, for example, a soft magnetic film made of Ni—Fe based alloy or the like, a spacer film made of Ti or the like, and an SAL bias film made of soft magnetic material such as Co—Zr—Nb based alloy, respectively formed in this order from the large area substrate 3a side by sputtering, vapor deposition or the like.

If the MR film 14 is a GMR film (a spin valve film), the film 14A has, for example, a free layer, a non-magnetic conductive layer, a magnetization pinning layer, and an antiferromagnetic layer, respectively formed in this order from the large area substrate 3a side by sputtering, vapor deposition or the like.

Next, a resist film having, for example, a two-layer structure, is formed on the film 14A and exposed into a predetermined pattern. After the exposure, the resist film is baked at a predetermined temperature and developed to form a mask.

For example, the resist film of the two-layer structure is constituted of a release layer (e.g., ARC manufactured by Brewer Science Corp.) formed on the film 14A and a positive type photoresist layer (e.g., AR80 manufactured by Tokyo Ohka Kogyo Co., Ltd.). One area to be shielded from exposure light includes, as viewed in plan, one MR film 14 to be formed.

Figure 7:
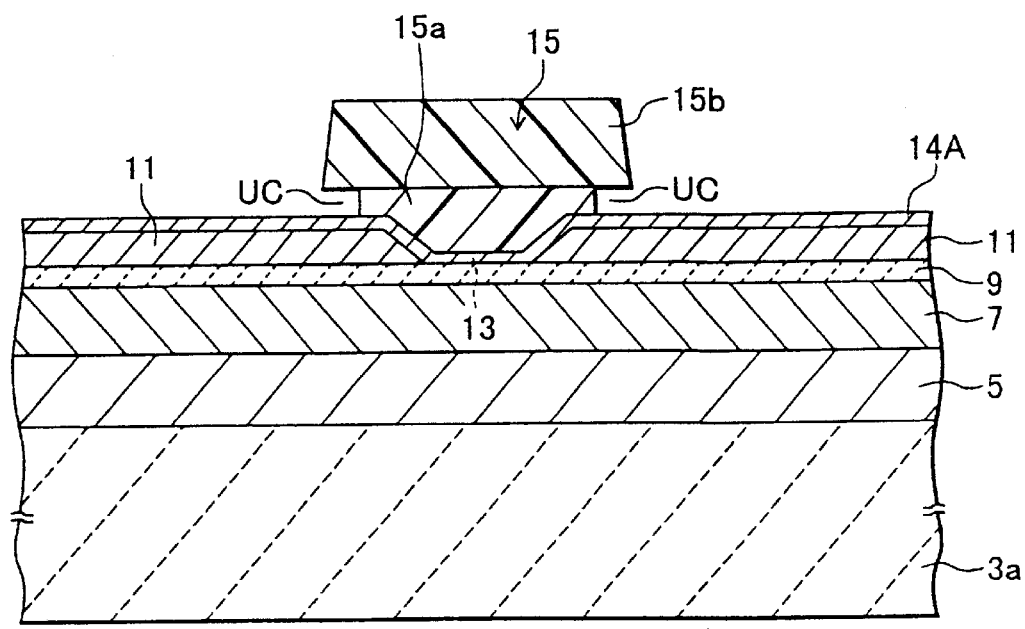

FIG. 7 shows a part of the obtained mask 15. As shown, the mask 15 is constituted of a release layer 15a covering the recess 13 and a positive type resist layer 15b formed on the release layer 15a. The positive resist layer 15b corresponds to the area exposed to light. An under cut UC is formed in the release layer 15. The size of the under cut UC can be controlled by a developing time.

Next, an ion beam of argon ions or the like is radiated to the large area substrate 3a along a direction perpendicular to the surface of the insulating film 5 to thereby etch (ion-mill) the mask 15 and film 14A.

Figure 8:
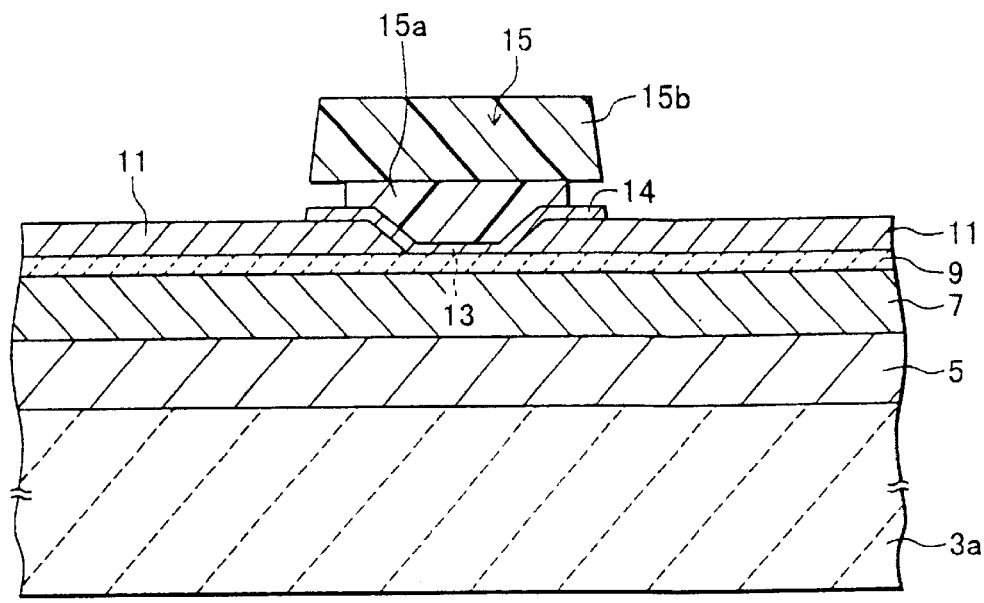

As shown in FIG. 8, the region as viewed in plan of the film 14A not covered with the mask 15 is removed by ion milling to leave the MR films 14.

If the ion beam is radiated along a direction slanted from the vertical direction, the side wall of the MR film 14 can be formed to have a desired forward tapered shape. Electrical connection to the conductive films 16 to be later formed can be made reliable.

By using this method, electrical connection between the MR film and conductive films of an MR head even of the conventional abutted junction structure can be improved. However, in the MR head of the abutted junction structure, a change in the shape of the MR film is directly associated with a change in the reading track width. Therefore, ion milling for forming the MR film cannot be performed by giving the priority order only to the electrical connection to the conductive films.

Figure 9:
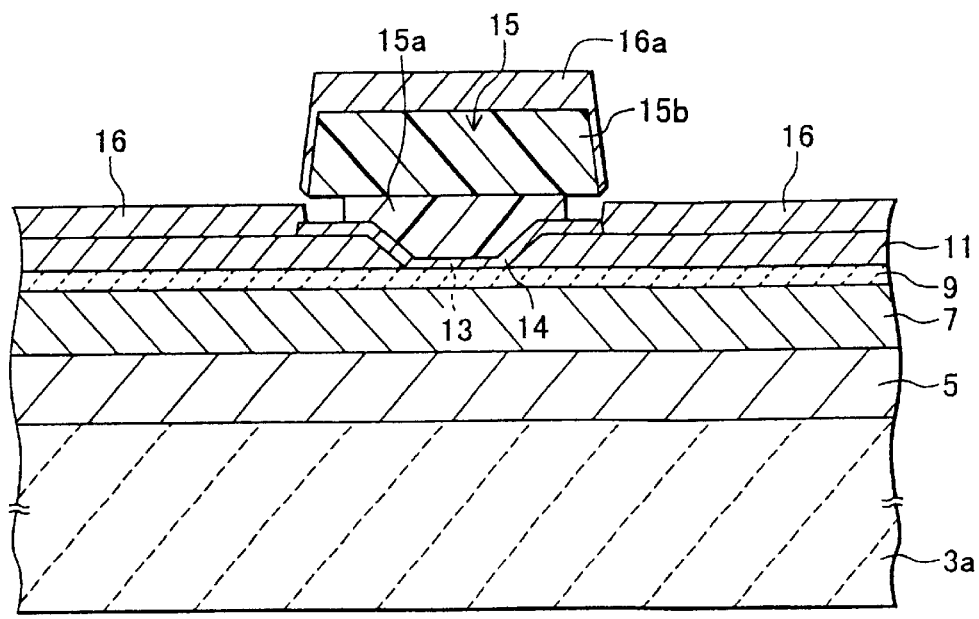

Next, as shown in FIG. 9, an electrically conductive film 16 is formed on an area as viewed in plan of the magnet films 11 not covered with the mask 15, by sputtering, vapor deposition or the like. The conductive film 16 is made of metal having a low electric resistance such as tungsten (W), tantalum (Ta) and niobium (Nb). The thickness of the conductive film is preferably set to a range of, e.g., from 50 to 200 nm.

Although the conductive films 16a is also formed on the surface of the mask 15, these films are removed at the same time when the mask 15 is lifted off.

Next, after the mask 15 together with the conductive films 16a formed thereon is lifted off, an inorganic insulating film such as alumina is formed on the MR films 14 and conductive films 16 to form an upper gap layer (refer to FIG. 1A) 17. On this upper gap layer 17, an upper shield film (refer to FIG. 1A) 18 and a protective film (refer to FIG. 1A) 19 are formed in this order by sputtering, vapor deposition or the like. With these processes, a number of MR heads 1 are formed on the large area substrate 3a.

These MR heads 1 together with partial regions of the large area substrate 3a are cut from the large area substrate 3a. The partial region of the large area substrate 3a of each cut MR head 1 is formed into a slider 3 (FIG. 1A). A number of MR heads 1 shown in FIG. 1 can therefore be obtained.

Figure 17:
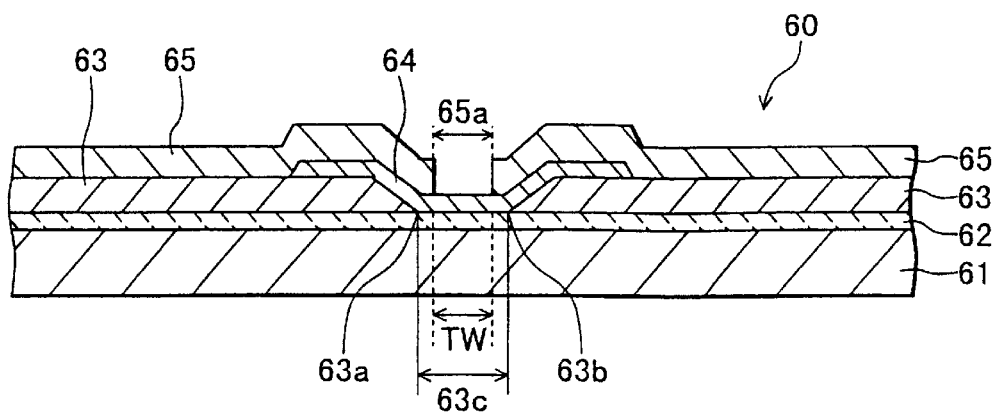
FIG. 17 is a schematic cross sectional view showing the main part of a conventional MR head having a gull wing lead-overlaid structure.
Figure 18:
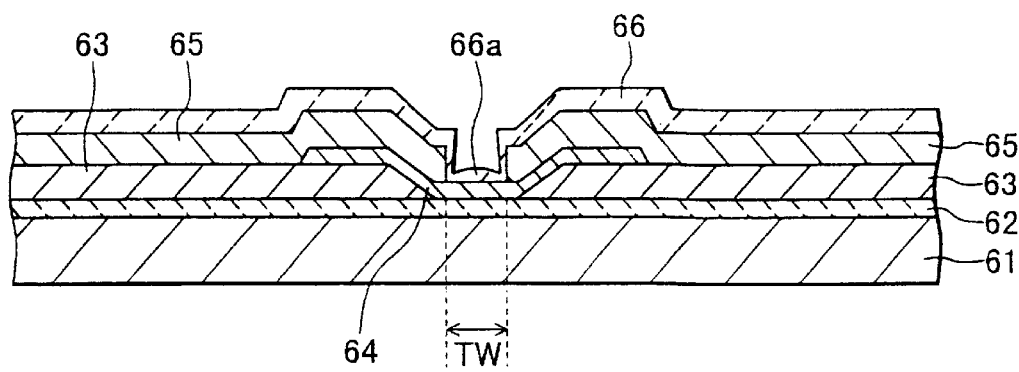
FIG. 18 is a cross sectional view of the MR head shown in FIG. 17 formed with an upper gap layer.
Figure 19:
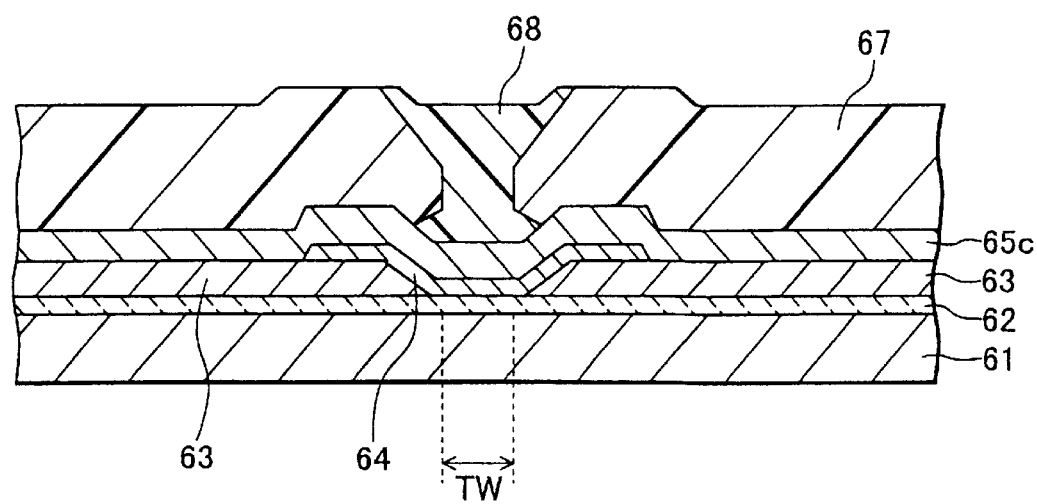
FIG. 19 is a schematic cross sectional view illustrating an exposure state of resist to be used for forming overlaid electrodes of the MR head shown in FIG. 17.
Figure 20:
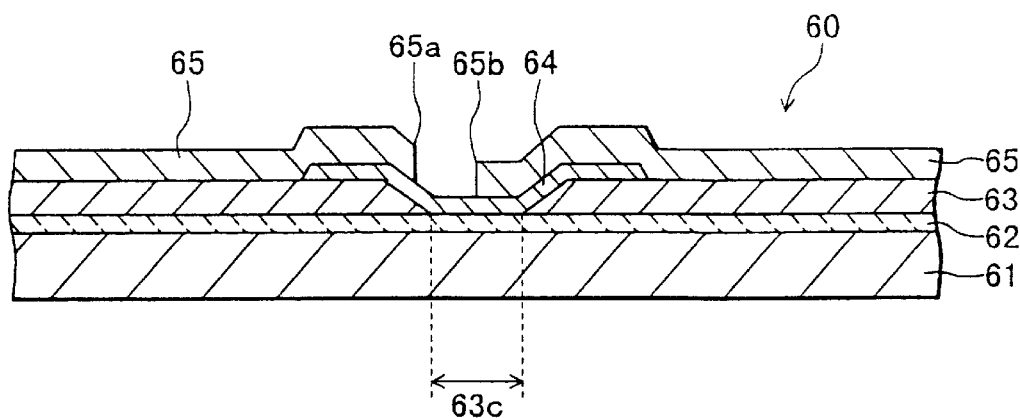
FIG. 20 is a schematic cross sectional view showing a gull wing lead-overlaid type MR head having a pair of overlaid electrodes shifted from desired positions.

Nine large area substrates each having a number of MR heads 1 formed on one surface of the substrate by the embodiment manufacture method and nine large area substrates each having a number of MR heads of a conventional gull wing lead-overlaid structure shown in FIG. 17 were prepared. Twenty MR heads were randomly sampled from each sample (large area substrate) and a variation in reading track widths TW ($\mu$m) was measured.

Figure 10:
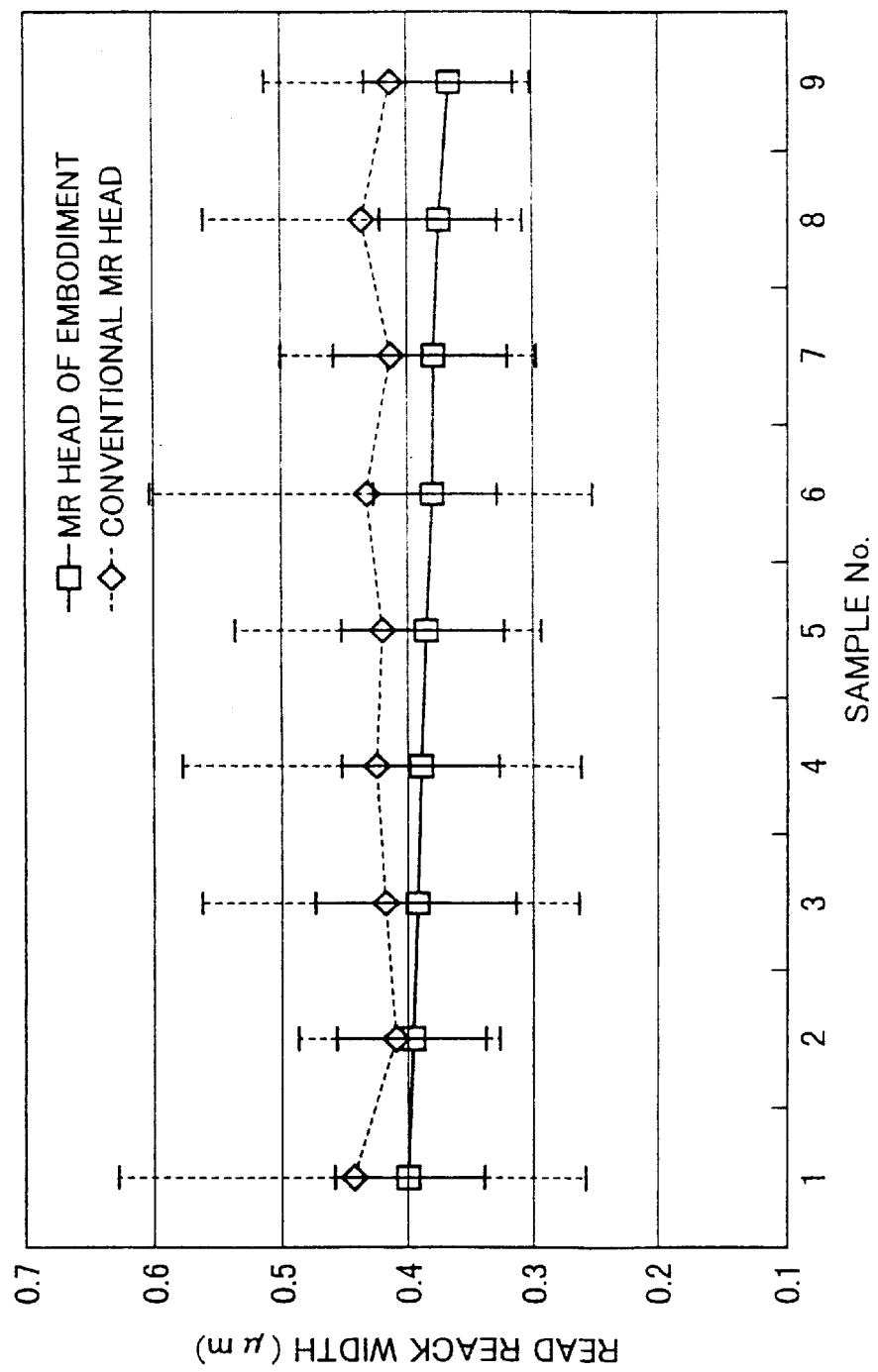
FIG. 10 is a graph showing the measurement results of variations in reading track widths of a number of MR heads formed on a large area substrate.

FIG. 10 is a graph showing measurement results. In FIG. 10, each error bar represents a variation of $\pm 3\sigma$ ($\sigma$ represents variance) in reading track widths TW of twenty MR heads of each sample (large area substrate).

The reading track width TW of the MR head 1 manufactured by the embodiment method is, as shown in FIG. 1A, a width of the region sandwiched between the tips of a pair of magnet films 11, 11. The reading track width TW of the MR head as a conventional example is, as shown in FIG. 17, a width of the region sandwiched between the tips of a pair of overlaid electrodes 65.

As seen from FIG. 10, a variation in the reading track width TW of the MR heads 1 manufactured by the embodiment method is smaller than that of the MR heads having the conventional gull wing lead-overlaid structure. With the embodiment method, a variation in reading track widths TW of MR heads 1 even under mass production can be suppressed small.

Next, a recording/reproducing magnetic head according to an embodiment will be described with reference to FIG. 11.

Figure 11:
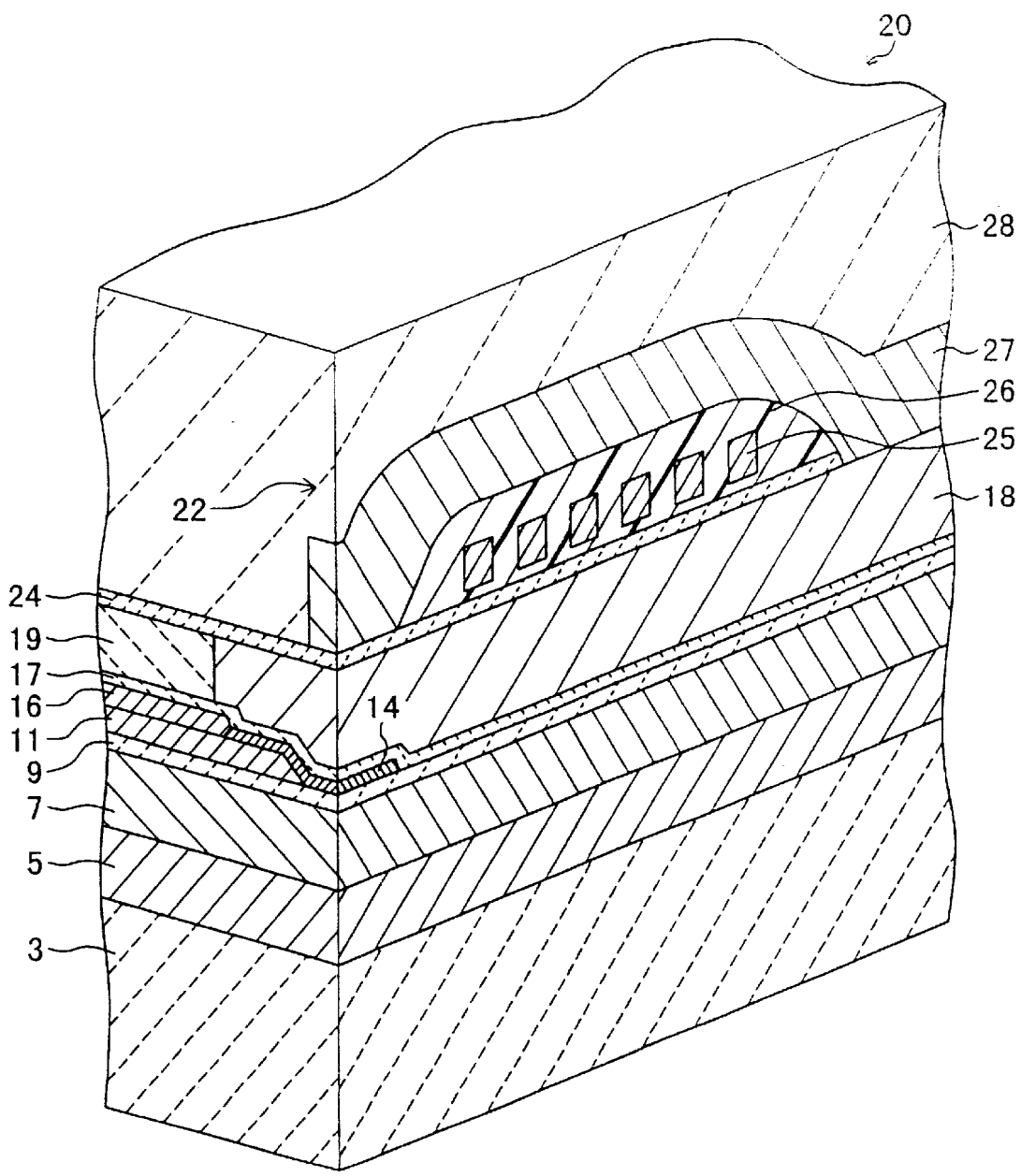
FIG. 11 is a perspective view partially in cross section schematically showing a recording/reproducing magnetic head according to an embodiment.

FIG. 11 is a schematic perspective view partially in cross section of a recording/reproducing magnetic head of the embodiment. A recording/reproducing magnetic head 20 shown in FIG. 11 has a writing head 22 which is an induction type recording head formed on the MR head 1 shown in FIG. 1A.

In this recording/reproducing magnetic head 20, an upper shield layer 18 having a predetermined shape is formed on the upper gap layer 17, the layer 18 being made of soft magnetic material such as Ni—Fe based alloy and Fe—Si—Al based alloy. This upper shield layer 18 is used also as the lower core of the writing head 22.

The writing head 22 includes in addition to the lower core (upper shield layer 18), a write gap layer 24 made of insulating material such as alumina and formed on the lower core, a coil 25 formed on the write gap layer 24, an insulating layer 26 formed around the conductor of the coil 25, and an upper core 27 of an arc shape formed overriding the coil 25 and insulating layer 26. A protective film 28 covers the upper core 27.

Next, a magnetic recording/reproducing apparatus according to an embodiment will be described with reference to FIG. 12.

Figure 12:
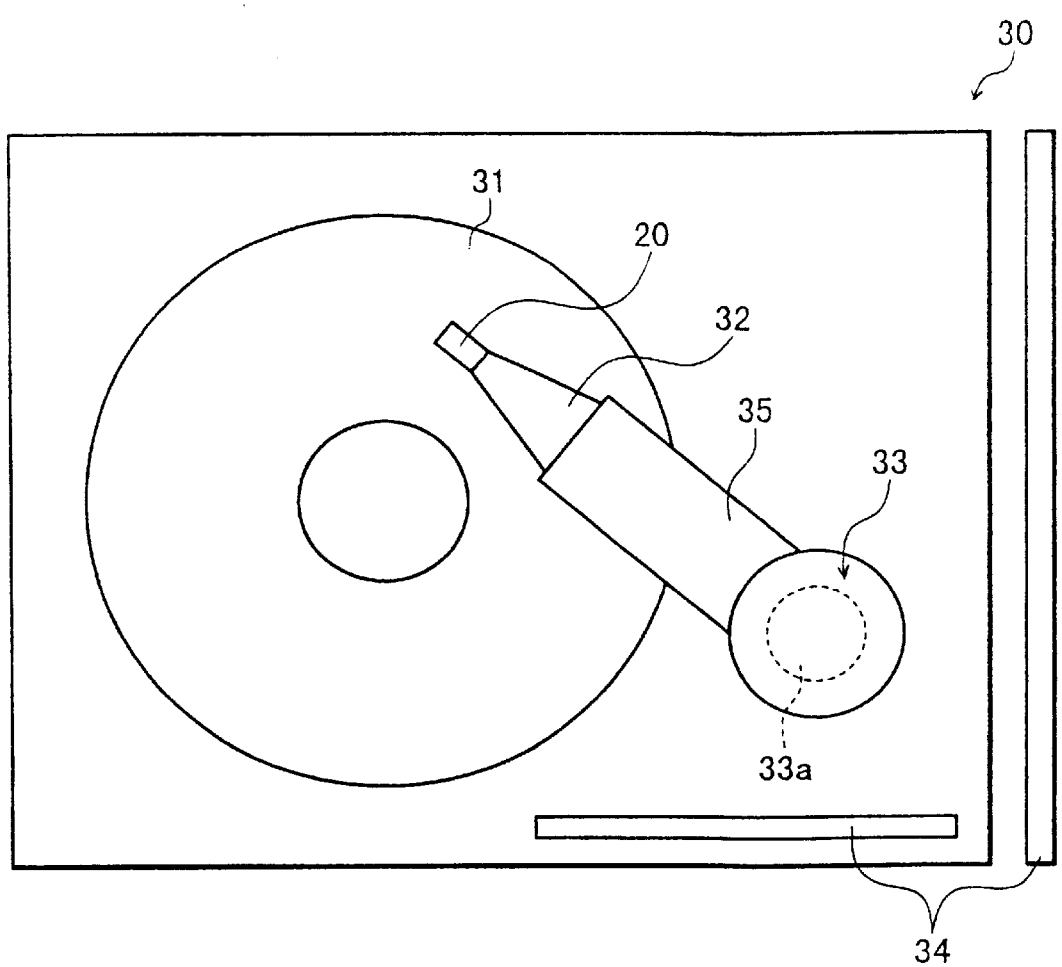
FIG. 12 is a schematic plan view of a recording/reproducing apparatus according to an embodiment.
Figure 13:
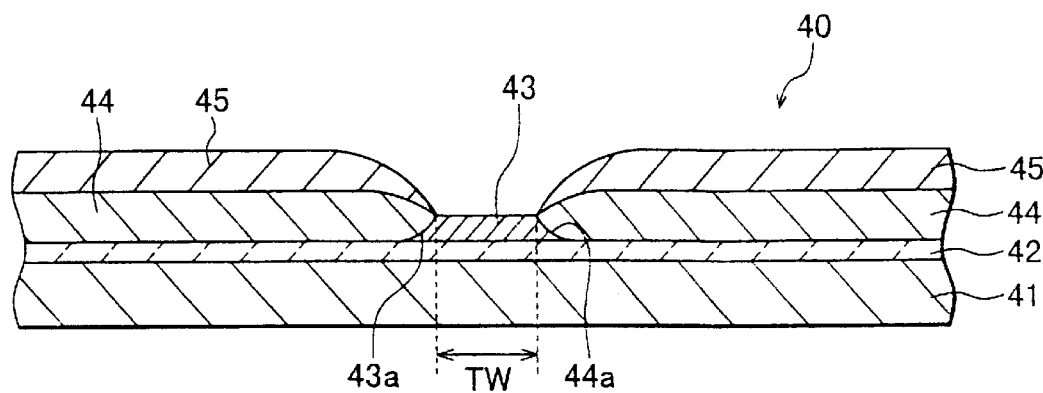
FIG. 13 is a schematic cross sectional view showing the main part of a conventional MR head having an abutted junction structure.
Figure 14:
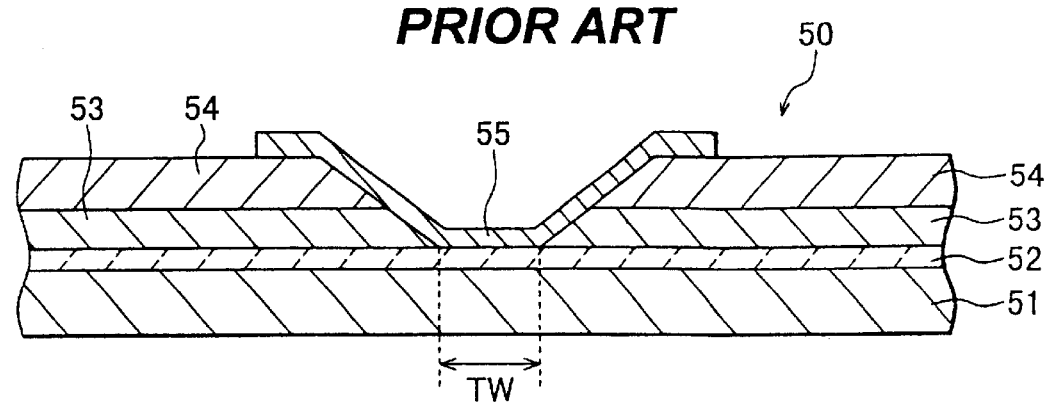
FIG. 14 is a schematic cross sectional view showing the main part of a conventional MR head having a gull wing structure.
Figure 15A:
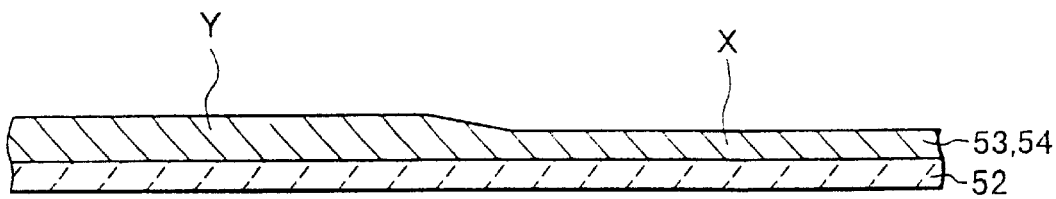
FIGS. 15A, 15B and 15C are schematic cross sectional views illustrating some manufacture processes for the MR head shown in FIG. 14.
Figure 15B:
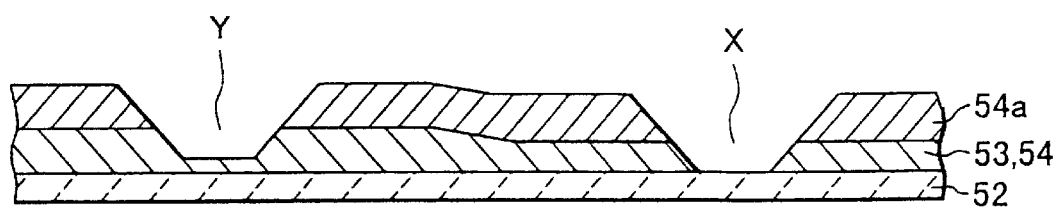
Figure 15C:
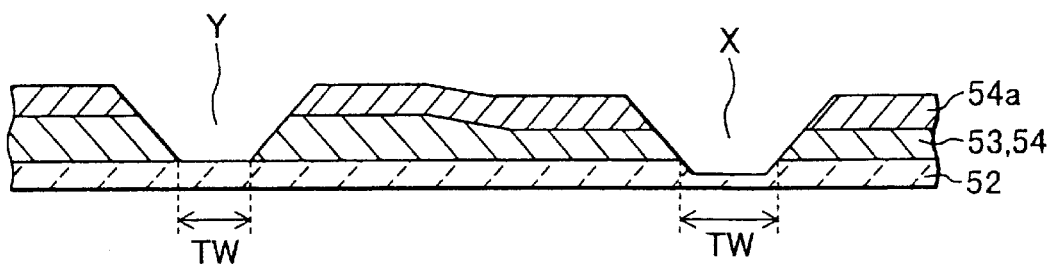

FIG. 12 is a schematic plan view of a magnetic recording/reproducing apparatus 30 of the embodiment. The magnetic recording/reproducing apparatus 30 shown in FIG. 12 includes a recording/reproducing magnetic head 20 shown in FIG. 11, a magnetic recording medium 31 to be rotated by an unrepresented driver (e.g., motor), a magnetic head driver 33 for rotating forward or backward a single rotary shaft 33a, and a recorded/reproduced signal processing circuit 34 for processing a recording signal to be supplied to the magnetic head 20 and processing a read-out signal output from the magnetic head 20.

The recording/reproducing magnetic head 20 is mounted on a suspension 32. The suspension 32 is mounted on the front end of an arm 35 which is mounted on the rotary shaft 33a and moves along an arc path over the magnetic recording medium 31 when driven by the rotary shaft 33a.

A magnetoresistive head, its manufacture method, a recording/reproducing magnetic head and a magnetic recording/reproducing apparatus of the embodiments have been described above. The invention is not limited only to these embodiments.

For example, each of the pair of electrically conductive films 16, 16 shown in FIG. 1A may be extended to the position over the MR film 14 if it is outside of the recess 13.

The pair of conductive films 16, 16 may also be formed by forming a conductive film covering the MR film 14 and the pair of magnet films 11, 11, then forming a mask on the conductive film in a predetermined area by photolithography, and then removing the conductive film in the area not covered with the mask by ion etching (ion milling) or the like.

It is apparent that various modifications, improvements, combinations, and the like can be made by those skilled in the art.

What is claimed is:

1. A magnetoresistive head, comprising:
   a lower shield layer formed on a substrate and made of soft magnetic material;
   a lower gap layer formed on said lower shield layer and made of insulating material;
   a pair of magnet films formed on said lower gap layer at a predetermined distance therebetween, said pair of magnet films defining a recess on said lower gap layer, the recess having generally an inverted trapezoid shape in cross section;
   a magnetoresistive film covering a bottom and side wall of the recess and partial upper surfaces of said pair of magnet films; and
   a pair of electrically conductive films, one of which is formed on one magnet film of said pair of magnet films and the other is formed on the other magnet film of said pair of magnet films, and being in contact with said magnetoresistive film only at a position outside of the recess.

2. A magnetoresistive head according to claim 1, wherein each of said magnet films is a uniaxial anisotropic permanent magnet film.

3. A magnetoresistive head according to claim 1, wherein said magnetoresistive film is an anisotropic magnetoresistive film.

4. A magnetoresistive head according to claim 3, wherein said anisotropic magnetoresistive film includes a free layer whose magnetization direction changes with an external magnetic field, a non-magnetic film formed on the free layer, and a soft magnetic film formed on the non-magnetic film.

5. A magnetoresistive head according to claim 1, wherein said magnetoresistive film is a giant magnetoresistive film.

6. A magnetoresistive head according to claim 5, wherein said giant magnetoresistive film is a spin valve film.

7. A magnetoresistive head according to claim 6, wherein said spin valve film includes a free layer whose magnetization direction changes with an external magnetic field, a non-magnetic layer formed on the free layer, a magnetization pinning layer formed on the non-magnetic layer, and an antiferromagnetic layer formed on the magnetization pinning layer.

8. A magnetoresistive head according to claim 1, wherein said pair of electrically conductive films are in contact with said magnetoresistive film at side walls thereof.

9. A magnetoresistive head according to claim 1, further comprising an upper gap layer made of inorganic insulating material and covering said magnetoresistive film and said pair of electrically conductive films.

10. A magnetoresistive head according to claim 1, further comprising an insulating film formed between said substrate and said lower shield layer.

11. A magnetoresistive head according to claim 1, wherein said substrate is a slider.

12. A recording/reproducing magnetic head comprising:
a reading-out magnetic head including (i) a lower shield layer formed on a substrate and made of soft magnetic material, (ii) a lower gap layer formed on said lower shield layer and made of insulating material, (iii) a pair of magnet films formed on said lower gap layer at a predetermined distance therebetween, said pair of magnet films defining a recess on said lower gap layer, the recess having generally an inverted trapezoid shape in cross section, (iv) a magnetoresistive film covering a bottom and side wall of the recess and partial upper surfaces of said pair of magnet films, (v) a pair of electrically conductive films, one of which is formed on one magnet film of said pair of magnet films and the other is formed on the other magnet film of said pair of magnet films, and being in contact with said magnetoresistive film only at a position outside of the recess, and (vi) an upper gap layer made of inorganic insulating material and covering said magnetoresistive film and said pair of electrically conductive films; and
a writing head formed on said reading-out magnetic head, said writing head being an induction type magnetic head.

13. A recording/reproducing magnetic head according to claim 12, wherein each of said magnet films is a uniaxial anisotropic permanent magnet film.

14. A recording/reproducing magnetic head according to claim 12, wherein said magnetoresistive film is an anisotropic magnetoresistive film.

15. A recording/reproducing magnetic head according to claim 14, wherein said anisotropic magnetoresistive film includes a free layer whose magnetization direction changes with an external magnetic field, a non-magnetic film formed on the free layer, and a soft magnetic film formed on the non-magnetic film.

16. A recording/reproducing magnetic head according to claim 12, wherein said magnetoresistive film is a giant magnetoresistive film.

17. A recording/reproducing magnetic head according to claim 16, wherein the giant magnetoresistive film is a spin valve film.

18. A recording/reproducing magnetic head according to claim 17, wherein said spin valve film includes a free layer whose magnetization direction changes with an external magnetic field, a non-magnetic layer formed on the free layer, a magnetization pinning layer formed on the non-magnetic layer, and an antiferromagnetic layer formed on the magnetization pinning layer.

19. A recording/reproducing magnetic head according to claim 12, wherein said pair of electrically conductive films are in contact with said magnetoresistive film at side walls thereof.

20. A recording/reproducing magnetic head according to claim 12, wherein said writing head includes a lower core formed on said upper gap layer, a write gap layer formed on the lower core, a coil formed on the write gap layer, an insulating layer formed around the conductor of the coil, and an upper core formed overriding the coil and insulating layer.

21. A recording/reproducing magnetic head according to claim 12, further comprising an insulating film formed between the substrate and said lower shield layer.

22. A recording/reproducing magnetic head according to claim 12, wherein said substrate is a slider.

23. A method of manufacturing a magnetoresistive head, comprising:
a preparing step of preparing a substrate including (i) a lower shield layer made of soft magnetic material, (ii) a lower gap layer formed on said lower shield layer and made of insulating material, (iii) a pair of magnet films formed on said lower gap layer at a predetermined distance therebetween, said pair of magnet films defining a recess on said lower gap layer, the recess having generally an inverted trapezoid shape in cross section, and (iv) a magnetoresistive film covering a bottom and side wall of the recess and partial upper surfaces of said pair of magnet films; and
an electrically conductive film forming step of forming a pair of electrically conductive films, one of which is formed on one magnet film of said pair of magnet films and the other is formed on the other magnet film of said pair of magnet films, and being in contact with said magnetoresistive film only at a position outside of the recess.

24. A method of manufacturing a magnetoresistive head according to claim 23, wherein:
said preparing step includes a first sub-step of forming a large area magnetoresistive film covering a bottom and side wall of the recess and partial upper surfaces of said pair of magnet films, a second sub-step of forming a mask on the large area magnetoresistive film, the mask covering as viewed in plan the recess, and a third sub-step of removing a portion of the large area magnetoresistive film not covered with the mask as viewed in plan to form the large area magnetoresistive film into said magnetoresistive film covering the bottom and side wall of the recess and the partial upper surfaces of said pair of magnet films; and
said electrically conductive film forming step includes a first sub-step of forming an electrically conductive film on said pair of magnet films by leaving the mask and a second sub-step of removing the mask after the electrically conductive film is formed.

25. A magnetic recording/reproducing apparatus, comprising:
a magnetic recording medium;
a magnetic head driving unit for rotating forward or backward rotating a rotary shaft;
an arm mounted on the rotary shaft and moving along an arc path over said recording medium when driven by the rotary shaft;
a suspension mounted on a front end of said arm; and
a recording/reproducing magnetic head mounted on said suspension, said recording/reproducing magnetic head including: a reading-out magnetic head including (i) a lower shield layer formed on a substrate and made of soft magnetic material, (ii) a lower gap layer formed on said lower shield layer and made of insulating material, (iii) a pair of magnet films formed on said lower gap layer at a predetermined distance therebetween, said pair of magnet films defining a recess on said lower gap layer, the recess having generally an inverted trapezoid shape in cross section, (iv) a magnetoresistive film covering a bottom and side wall of the recess and partial upper surfaces of said pair of magnet films, (v)

a pair of electrically conductive films, one of which is formed on one magnet film of said pair of magnet films and the other is formed on the other magnet film of said pair of magnet films, and being in contact with said magnetoresistive film only at a position outside of the recess, and (vi) an upper gap layer made of inorganic insulating material and covering said magnetoresistive film and said pair of electrically conductive films; and a writing head formed on said reading-out magnetic head, said writing head being an induction type magnetic head.

26. A magnetic recording/reproducing apparatus according to claim 25, wherein each of said magnet films is a uniaxial anisotropic permanent magnet film.

27. A magnetic recording/reproducing apparatus according to claim 25, wherein said magnetoresistive film is an anisotropic magnetoresistive film.

28. A magnetic recording/reproducing apparatus according to claim 27, wherein said anisotropic magnetoresistive film includes a free layer whose magnetization direction changes with an external magnetic field, a non-magnetic film formed on the free layer, and a soft magnetic film formed on the non-magnetic film.

29. A magnetic recording/reproducing apparatus according to claim 25, wherein said magnetoresistive film is a giant magnetoresistive film.

30. A magnetic recording/reproducing apparatus according to claim 29, wherein said giant magnetoresistive film is a spin valve film.

31. A magnetic recording/reproducing apparatus according to claim 30, wherein said spin valve film includes a free layer whose magnetization direction changes with an external magnetic field, a non-magnetic layer formed on the free layer, a magnetization pinning layer formed on the non-magnetic layer, and an antiferromagnetic layer formed on the magnetization pinning layer.

32. A magnetic recording/reproducing apparatus according to claim 25, wherein said pair of electrically conductive films are in contact with said magnetoresistive film at side walls thereof.

33. A magnetic recording/reproducing apparatus according to claim 25, wherein said writing head includes a lower core formed on said upper gap layer, a write gap layer formed on the lower core, a coil formed on the write gap layer, an insulating layer formed around the conductor of the coil, and an upper core formed overriding the coil and insulating layer.

34. A magnetic recording/reproducing apparatus according to claim 25, further comprising an insulating film formed between the substrate and said lower shield layer.

35. A magnetic recording/reproducing apparatus according to claim 25, wherein said substrate is a slider.

* * * * *